US006981374B2

(12) United States Patent
von Behrens et al.

(10) Patent No.: US 6,981,374 B2
(45) Date of Patent: Jan. 3, 2006

(54) SMA ACTUATOR WITH IMPROVED TEMPERATURE CONTROL

(75) Inventors: Peter E. von Behrens, Antioch, CA (US); Dylan M. Fairbanks, Crockett, CA (US)

(73) Assignee: Alfmeier Prazision AG, Treuchtlingen (DE)

( * ) Notice: Subject to any disclaimer, the term of this patent is extended or adjusted under 35 U.S.C. 154(b) by 0 days.

(21) Appl. No.: 10/080,640

(22) Filed: Feb. 21, 2002

(65) Prior Publication Data

US 2002/0113499 A1 Aug. 22, 2002

Related U.S. Application Data

(60) Provisional application No. 60/270,985, filed on Feb. 22, 2001.

(51) Int. Cl.
*F01B 29/10* (2006.01)

(52) U.S. Cl. .......................................... 60/527; 60/528

(58) Field of Classification Search .................. 60/527, 60/528

See application file for complete search history.

(56) References Cited

U.S. PATENT DOCUMENTS

| | | | | |
|---|---|---|---|---|
| 348,841 A | | 9/1886 | Hainley | |
| 1,658,669 A | | 2/1928 | Cohn et al. | |
| 2,518,941 A | * | 8/1950 | Satchwell et al. | 337/107 |
| 2,975,307 A | | 3/1961 | Schroeder et al. | |
| 3,452,175 A | | 6/1969 | Wikes | |
| 3,452,309 A | | 6/1969 | Wikes | |
| 3,641,296 A | | 2/1972 | Schwarz | |
| 3,725,835 A | | 4/1973 | Hopkins et al. | |
| 3,940,935 A | | 3/1976 | Richardson et al. | |
| 4,027,953 A | | 6/1977 | Jacob | |

(Continued)

FOREIGN PATENT DOCUMENTS

| | | |
|---|---|---|
| DE | 4209815 A1 | 9/1993 |
| DE | 19509177 A1 | 9/1996 |
| EP | 0147491 A1 | 7/1985 |
| FR | 77 09117 | 10/1978 |

(Continued)

OTHER PUBLICATIONS

Aircraft Maneuverability, http://www.cs.ualberta.ca/~database/MEMS/sma_mems/flap.html, last modified Aug. 17, 2001, printed Apr. 17, 2003, pp. 1–2.

Bokaie, Latch–Release Pin Puller with Shape–Memory Alloy Actuator, Lewis Research Center, http://www.nasatech.com/Briefs/Feb98/LEW16511.html, printed Apr. 17, 2003.

(Continued)

*Primary Examiner*—Hoang Nguyen
(74) *Attorney, Agent, or Firm*—Dority & Manning, P.A.

(57) ABSTRACT

A SMA actuator having rigid members and SMA wires, in which improved temperature control of the SMA wires of the actuator is provided by a heat sink, which may be the rigid members themselves, in close proximity to at least a central portion of the wires. Optionally, the heat sink is sized and placed such that the end portions of the wires where they are attached to the rigid members are not in close proximity to the heat sink. Where the heat sink is external, it optionally has a cooling element that acts passively as a heat sink during the heating cycle of the actuator and that acts as an active cooling element during the cooling cycle of the actuator. An SMA actuator having a desired contraction limit and a power supply circuit has a switch in the power supply circuit that is normally closed when the actuator is contracted to less than the desired contraction limit and is opened by the actuator reaching the desired contraction limit. This improved temperature control provides greater cooling of the SMA wires for a faster response and an extended working life of the actuator.

36 Claims, 5 Drawing Sheets

U.S. PATENT DOCUMENTS

| | | | | |
|---|---|---|---|---|
| 4,150,544 | A | | 4/1979 | Pachter |
| 4,559,512 | A | | 12/1985 | Yaeger et al. |
| 4,579,006 | A | | 4/1986 | Hosoda et al. |
| 4,586,335 | A | | 5/1986 | Hosoda et al. |
| 4,626,085 | A | | 12/1986 | Suzuki |
| 4,742,680 | A | | 5/1988 | Mecca |
| 4,751,821 | A | | 6/1988 | Birchard |
| 4,806,815 | A | | 2/1989 | Honma |
| 4,811,564 | A | | 3/1989 | Palmer |
| 4,829,767 | A | | 5/1989 | Mecca |
| 4,841,730 | A | | 6/1989 | McDonald |
| 4,884,557 | A | | 12/1989 | Takehana et al. |
| 4,932,210 | A | | 6/1990 | Julien et al. |
| 4,977,886 | A | | 12/1990 | Takehana et al. |
| 5,014,520 | A | | 5/1991 | Orner et al. |
| 5,092,781 | A | | 3/1992 | Casciotti et al. |
| 5,127,228 | A | | 7/1992 | Swenson |
| 5,129,753 | A | | 7/1992 | Wesley et al. |
| 5,165,897 | A | * | 11/1992 | Johnson ...................... 434/113 |
| 5,166,832 | A | | 11/1992 | Zychowicz |
| 5,172,551 | A | | 12/1992 | Nakajima et al. |
| 5,235,225 | A | | 8/1993 | Colgate et al. |
| 5,312,152 | A | | 5/1994 | Woebkenberg, Jr. et al. |
| 5,344,506 | A | | 9/1994 | DeAngelis |
| 5,556,370 | A | | 9/1996 | Maynard |
| 5,563,466 | A | | 10/1996 | Rennex et al. |
| 5,618,066 | A | | 4/1997 | Fu-Hsiang |
| 5,685,148 | A | | 11/1997 | Robert |
| 5,747,993 | A | | 5/1998 | Jacobsen et al. |
| 5,763,979 | A | | 6/1998 | Mukherjee et al. |
| 5,770,913 | A | | 6/1998 | Mizzi |
| 5,771,742 | A | | 6/1998 | Bokaie et al. |
| 5,829,253 | A | | 11/1998 | Long et al. |
| 5,901,554 | A | | 5/1999 | Greschik |
| 5,917,260 | A | | 6/1999 | Garcia et al. |
| 6,019,113 | A | | 2/2000 | Allston et al. |
| 6,069,420 | A | | 5/2000 | Mizzi et al. |
| 6,126,115 | A | | 10/2000 | Carrier et al. |
| 6,164,784 | A | | 12/2000 | Butera et al. |
| 6,218,762 | B1 | | 4/2001 | Hill et al. |
| 6,326,707 | B1 | * | 12/2001 | Gummin et al. .............. 310/12 |
| 6,327,855 | B1 | | 12/2001 | Hill et al. |
| 6,333,583 | B1 | | 12/2001 | Mahadevan et al. |
| 6,364,496 | B1 | | 4/2002 | Boddy et al. |
| 6,374,608 | B1 | | 4/2002 | Corris et al. |
| 6,404,098 | B1 | | 6/2002 | Kayama et al. |
| 6,434,333 | B2 | | 8/2002 | Tanaka et al. |
| 6,450,064 | B1 | | 9/2002 | Christiansen et al. |
| 6,574,958 | B1 | * | 6/2003 | MacGregor .................. 60/527 |

FOREIGN PATENT DOCUMENTS

| | | | |
|---|---|---|---|
| FR | 2730766 | | 8/1996 |
| GB | 2093589 | A | 9/1982 |
| GB | 2334046 | A | 8/1999 |
| JP | 07 274561 | A | 10/1995 |
| KR | 9605617 | B1 | 4/1996 |
| KR | 9607599 | B1 | 6/1996 |
| WO | WO 98/08355 | | 2/1998 |
| WO | WO 01/12985 | A1 | 2/2001 |

OTHER PUBLICATIONS

Bone Plates, http://www.cs.ualberta.ca/~database/MEMS/sma_mems/bone.html, last modified Aug. 17, 2001, printed Apr. 17, 2003, pp. 1–2.

Glossary: Pseudo–elasticity (or super–elasticity), http://www.cs.ualberta.ca/~database/MEMS/sma_mems/glossary.cgi, last modified Aug. 17, 2001, printed Apr. 17, 2003, pp. 1–2.

Glossary: Shape Memory effect, http://www.cs.ualberta.ca/~database/MEMS/sma_mems/glossary.cgi, last modified Aug. 17, 2001, printed Apr. 17, 2003, pp. 1–2.

Grant et al., "Variable Structure Control of Shape Memory Alloy Actuators," *IEEE Control Systems* 17(3):80–88, 1997.

Hashimoto et al., "Application of Shape Memory Alloy to Robotic Actuators," *J. Robotic Systems* 2(1):3–25, 1985.

Hirose et al., "A new design of servo–actuators based on the shape memory effect," *Theory and Practice of Robots and Manipulators*, 339–349, 1984.

Hodgson et al., Shape Memory Alloys, http://www.sma–inc.com/SMAPaper.html, 1999, printed Apr. 17, 2003, pp 1–2.

Ikuta et al., "Mathematical model and experimental verification . . . ," *IEEE Robotics and Automation* 4:103–108, 1991.

Ikuta et al., "Shape Memory Alloy Servo Actuator System with Electric Resistance Feedback and Application for Active Endoscope," *Proc. IEEE Int. Conf. On Robotics and Information* 427–430, 1988.

Ikuta, "Micro/Miniature Shape Memory Alloy Actuator," *IEEE Robotics and Automation* 3:2156–2161, 1990.

Kuribayashi, "A New Actuator of a Joint Mechanism Using TiNi Alloy Wire," *Int. J. Robotics* 4(4):47–58, 1986.

Mills JW, "Lukasiewicz' Insect: The Role of Continuous–Valued Logic in a Mobile Robot's Sensors, Control, and Locomotion," in *Siquito: Advanced Experiments with a Simple and Inexpensive Robot* Chapter 12, pp. 197–211, IEEE Computer Society Press, Los Alamitos, CA USA ISBN 0–8186–7408–3, 1993.

Otsuka et al., "Shape Memory Materials," pp. 36–48, Cambridge University Press, Cambridge, England, 1998, ISBN 0–521–4487X.

Rediniotis et al., Development of a Shape–Memory–Alloy Actuated Biomimetic Hydrofoil, Journal fo Intelligent Material Systems and Structures, 13:35–49, 2002.

Robotic Muscles, http://www.cs.ualberta.ca/~database/MEMS/sma_mems/muscle.html, last modified Aug. 17, 2001, printed Apr. 17, 2003, pp. 1–2.

Shape Memory Alloys, http://www.cs.ualberta.ca/~database/MEMS/sma_mems/sma.html, last modified Aug. 17, 2001, printed Apr. 17, 2003, pp. 1–4.

Smith et al., Development of Shape Memory Alloy (SMA) Actuated Mechanisms for Spacecraft Release Applications, SSC99–XI–7, 13$^{th}$ AIAA/USU Conference on Small Satellites.

Technical Characteristics of FLEXINOL™ Actuator Wires, Dynalloy, Inc., printed on Feb. 26, 2001.

WPI Database XP002202662, "Shape memory metal actuator control device—has minimum and maximum detector to monitor state of actuator based on its minimum and maximum allowable impedance," Oct. 20, 1995.

* cited by examiner

SMA ACTUATOR WITH IMPROVED TEMPERATURE CONTROL

CROSS-REFERENCE TO RELATED APPLICATION

This application claims the priority under 35 USC 119(e) of Provisional Application No. 60/270,985, filed Feb. 22, 2001, the disclosure of which is incorporated by reference into this application.

BACKGROUND OF THE INVENTION (a) Field of the Invention

This invention relates to shape-memory alloy (SMA) actuators. In particular, this invention relates to SMA actuators, especially miniaturizable SMA actuators, with improved temperature control for faster response and extended working life.

(b) Description of Related Art

A class of materials was discovered in the 1950s that exhibit what is known as the shape memory effect. See, for example, K. Otsuka, C. M. Wayman, "Shape Memory Materials", Cambridge University Press, Cambridge, England, 1998, ISBN 0-521-44487X. These materials exhibit a thermoelastic martensite transformation; i.e. they are pliable below a certain transition temperature because the material is in its martensite phase and can be easily deformed. When their temperature is raised above the transition temperature the material reverts to its austenite phase and its previous shape, generating a large force as it does so. Example of such materials are approximately 50:50 atom percent titanium-nickel (TiNi) alloys, optionally containing small quantities of other metals to provide improved stability or to alter the martensite-austenite transition temperatures; and these can be formulated and treated to exhibit the shape memory effect. Other such alloys include Cu/Al/Ni and Cu/Al/Zn alloys, sometimes known as β-brasses. Such alloys are generically referred to as shape memory alloys (SMA) and are commercially available from a number of sources in wire form, with diameters from as low as 37 μm to 1 mm or greater. See, for example, Dynalloy Corp., "Technical Characteristics of Flexinol Actuator Wires", Technical Information Pamphlet, Dynalloy Corp., Irvine Calif., USA.

SMA wires are wires of shape memory alloy that are treated such that they can be easily stretched along their longitudinal axis while in the martensite phase, thus re-arranging their atomic crystalline structure. Once stretched they remain that way until they are heated above their austenite transition temperature, at which point the crystalline structure is restored to its original (remembered) austenite configuration. This reversion not only returns the wire to its original length, but also generates a large force, typically on the order of 50 Kgf/mm$^2$ cross-sectional area, depending on the alloy and its treatment. Because of the large available force per cross-sectional area, SMA wires are normally produced in small diameters. For example, a 100 μm diameter wire can deliver about 250 g of force. To obtain more force, thicker wires or multiple wires are required.

Although SMAs have been known since 1951, they have found limited commercial actuator applications due to some inherent limitations in the physical processes which create the shape memory properties. This lack of commercial applications is due to a combination of the following factors:

(1) Limited Displacement

A TiNi SMA wire can contract by at most 8% of its length during the thermoelastic martensite to austenite transition. However, it can only sustain a few cycles at this strain level before it fails. For a reasonable cycle life, the maximum strain is in the 3–5% range. As an example, for an actuator with reasonable cycle life, it requires over 25 cm of SMA wire to produce 1 cm of movement.

(2) Minimum Bend Radius

An obvious solution to packaging long lengths of SMA into small spaces is to use some kind of pulley system. Unfortunately SMA wires can be damaged if they are routed around sharp bends. Typically an SMA wire should not be bent around a radius less than fifty times the wire diameter. As an example, a 250 μm diameter wire has a recommended minimum bending radius of approximately 1.25 cm for high cycle life. It should be noted that the term "minimum bending radius" as used here means the minimum radius within which an SMA wire can be bent and still be capable of repeated austenite-martensite cycling without damage. The addition of a large number of small pulleys makes a system mechanically complex, eliminating one of the attractions of using SMA in the first place. Also the minimum bend radius requirement places a lower limit on actuator size.

(3) Cycle Time

An SMA wire is normally resistively heated by passing an electric current through it. The wire then has to cool below its $M_s$ temperature before it can be stretched back to its starting position. If this cooling is achieved by convection in still air, then it can take many seconds before the actuator can be used again. The 250 μm wire discussed above has a best cycle time of about 5 seconds or more in free air. Thus, as an example, Stiquito, an SMA powered walking insect [J. M. Conrad, J. W. Mills, "*Stiquito: Advanced Experiments with a Simple and Inexpensive Robot*", IEEE Computer Society Press, Los Alamitos Calif., USA, ISBN 0-8186-7408-3] achieves a walking speed of only 3–10 cm/min. Since the rate of cooling depends on the ratio of the surface area of the wire to its volume, changes in wire diameter affect the cycle time, with smaller wires having shorter cycle times.

The problems of cycle time are exacerbated when the SMA actuator is subjected to repeated on-off cycling, such as if it were used in a Stiquito or similar toy or in another environment where the actuator is constantly cycled. Then, the air and any other components around the SMA elements may well become heated above external ambient temperature, resulting in a reduced ability of the SMA elements to release heat and cool to the martensitic state.

Working life (number of cycles) can also be adversely affected by the inability to control cooling, as rapid heating to achieve fill contraction can often result in the temperature of the SMA wire considerably exceeding the $A_f$ temperature, particularly over the central portion of the wire; and such repeated large temperature excursions cause fatigue in the wire and loss of working life.

To overcome these limitations designers of SMA based actuators have typically used long straight wires or coils. See, for example, M. Hashimoto, M. Takeda, H. Sagawa, I. Chiba, K. Sato, "Application of Shape Memory Alloy to Robotic Actuators", *J. Robotic Systems*, 2(1), 3–25 (1985); K. Kuribayashi, "A New Actuator of a Joint Mechanism using TiNi Alloy Wire", *Int. J. Robotics*, 4(4), 47–58 (1986); K. Ikuta, "Micro/Miniature Shape Memory Alloy Actuator", *IEEE Robotics and Automation*, 3, 2151–2161 (1990); and K. Ikuta, M. Tsukamoto, S. Hirose, "Shape Memory Alloy Servo Actuator with Electrical Resistance Feedback and Application for Active Endoscope", *Proc. IEEE Int. Conf. on Robotics and Information*, 427–430 (1988). Clearly, in many applications, especially where miniaturization is desired, it is impractical to use long straight wires. Coils, although greatly increasing the stroke delivered, are bulky and significantly decrease the available force (the force is proportional to the sine of the pitch angle—the angle between the axis of the coil as a whole and the axis of a single turn of the coil—and that may be as low as a few degrees); and, to compensate for the drop in force, thicker wires are used which reduce the responsiveness of the resulting actuator, making it unsuitable for many applications.

Other mechanisms commonly used to mechanically amplify the available displacement, such as those disclosed in D. Grant, V. Hayward, "Variable Control Structure of Shape Memory Alloy Actuators", *IEEE Control Systems*, 17(3), 80–88 (1997) and in U.S. Pat. No. 4,806,815, suffer from the same limitation on available force, again leading to the requirement for thicker wires and the attendant problems with cycle time.

A common method of heating SMA actuators to their transition temperature is pulse width modulation (PWM). In this scheme, a fixed voltage is applied for a percentage of a pre-set period. As the percentage on-time to off-time in a single period (referred to as the duty cycle) is changed, the aggregate amount of power delivered to the SMA can be controlled. This scheme is popular because of the ease with which it can be implemented in digital systems, where a single transistor is all that is required to drive an actuator, obviating the need for digital-to-analog conversion and the associated amplifiers.

PWM control is particularly attractive because many commercial micro-controllers contain built-in hardware for generating PWM signals, reducing the computational overhead on the controller; also, PWM output is often used in sound chips (such as those used in "talking" greeting cards and the like) as an inexpensive D-A conversion mechanism, making these low cost chips suitable as controllers for SMA actuators of this invention. In some applications, full PWM control may not be required, and an inexpensive timer chip could be used to generate the required digital signals. Also, PWM control reduces average current draw when a temperature signal is available, because no current limiting resistor is needed to prevent overheating the SMA element. Also, because current flow in an SMA wire tends (as with all solid conductors) to be concentrated at the surface of the wire, there is the risk of "hot-spots" and uneven heat distribution, reducing the life of the wire. Pulsing the activating voltage allows for thermal conduction in the SMA wire to lead to more even heat distribution. Further, in a conventional DC control system, the SMA current is effectively constant and relatively low, because it is determined by the current-limiting resistor, the value of which is chosen to avoid overheating of the SMA element once it is fully contracted. In a PWM or pulsed scheme with resistance feedback, a high duty cycle can be used to heat the SMA element initially, leading to rapid initial movement. The duty cycle can be reduced when the SMA element reaches the desired position, supplying only enough power to maintain the SMA element in the desired state.

The transition from the martensite (low temperature) phase to the austenite (high temperature) phase in SMAs does not happen instantaneously at a specific temperature but rather progresses incrementally over a temperature range. FIG. 1 shows the relationship between displacement and temperature for a typical SMA wire that has been placed under tensile stress and extended in its martensitic state, contracting on heating and conversion to the austenitic state, and re-extending as it cools and reverts to the martensitic state under the tensile stress. FIG. 1 shows the austenite start $A_s$ and austenite finish $A_f$ temperatures, as well as the martensite start and finish temperatures $M_s$ and $M_f$, respectively. In the temperature range indicated by $\Delta T$ the alloy consists of a mixture of austenite and martensite. As can be seen, substantially no change in length occurs below $A_s$, and substantially no further change in length occurs above $A_f$, as the SMA is heated. Similarly, on cooling substantially no change in length occurs above $M_s$, and substantially no further change in length occurs below $M_f$; however, there is typically substantial hysteresis in the length-temperature curve. Also, maximum contraction of an SMA wire requires heating the wire to a temperature above $A_f$, and maximum re-extension requires cooling to a temperature below $M_s$. This means that in practice such wires are frequently desired to be operated over a range of well below $M_s$ to well above $A_f$ to achieve maximum contraction/re-extension.

The disclosures of all documents cited in this section and elsewhere in this application are incorporated by reference into this application.

It would be desirable to develop SMA actuators with improved temperature control for faster response (lower cycle time) and extended working life (greater number of cycles achievable).

SUMMARY OF THE INVENTION

In a first aspect, this invention provides a SMA actuator comprising rigid members and SMA wires, in which improved temperature control of the SMA wires of the actuator is provided by a heat sink in close proximity to at least a central portion of the wires. Where the rigid members are highly thermally conductive (such as when they are metallic), the heat sink may comprise the rigid members themselves, so that the wires should be in close proximity to the rigid members over at least a central portion of the wires; or the heat sink may be external to the actuator. The actuator is typically a "stacked plate" actuator. In a second aspect, the heat sink is sized and placed such that the end portions of the wires where they are attached to the rigid members are not in close proximity to the heat sink. In a third aspect, this invention is a shape memory alloy actuator having an external heat sink that comprises a cooling element that acts passively as a heat sink during the heating cycle of the actuator and that acts as an active cooling element during the cooling cycle of the actuator. In a fourth aspect, this invention provides an SMA actuator having a desired contraction limit and a power supply circuit, the power supply circuit comprising a switch that is normally closed when the actuator is contracted to less than the desired contraction limit and is opened by the actuator reaching the desired contraction limit.

The improved temperature control in these actuators provides greater cooling of the SMA wires for a faster response (shorter cycle time) of the actuators and, because overheating and consequent fatiguing of the wires can be avoided, also provides an extended working life for the actuators.

DETAILED DESCRIPTION OF THE INVENTION

Definitions and General Parameters

Figure 1:
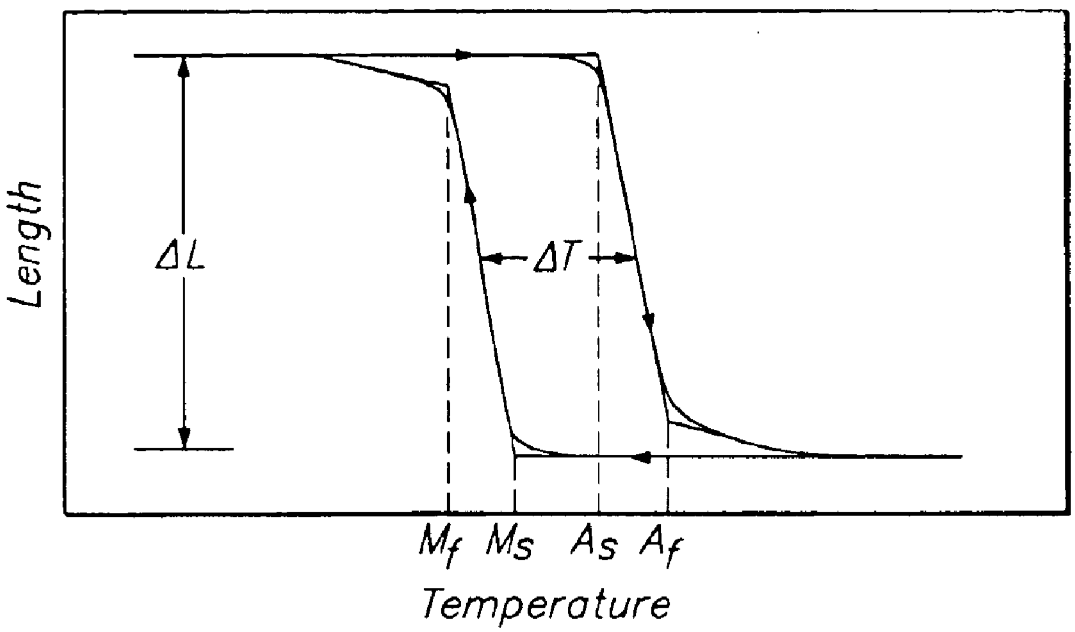
FIG. 1 shows a length versus temperature graph for a typical SMA element.

A "shape memory alloy" or "SMA" is an alloy that exhibits a thermoelastic martensite transformation, such that it can be deformed while in the martensite phase and the deformation is recovered when the alloy returns to the austenite phase. SMAs suitable for room temperature applications of this invention are those that have an austenite-martensite transition range somewhat above expected ambient temperature, say a martensite finish ($M_f$) temperature of 30–50° C., so that the SMA will remain in its martensite phase in the absence of applied heating, and an austenite finish ($A_f$) temperature that is low enough to be compatible with common engineering plastics, say an austenite finish temperature of 80–100° C., to minimize the amount of heating (e.g. electrical energy input to the SMA) required to complete the martensite-to-austenite transition. Such alloys are readily commercially available. Alloys with other transition temperature ranges may be chosen for actuators designed to operate at decreased (e.g. below 0° C.) or elevated (e.g. above 100° C.) temperature environments, and a person of ordinary skill in the art will have no difficulty, having regard to that skill and this disclosure, in choosing a suitable SMA for a desired purpose. It is well known that, when an SMA element, such as an SMA wire, is deformed within the recoverable range of strain below its $M_f$ temperature, and then heated to above the $A_f$ temperature, it will revert to its original undeformed shape. However, re-cooling of the element below the $M_f$ temperature again generally will not cause reversion to the deformed shape spontaneously—the shape memory effect is generally a one-way effect. Thus a stress, or bias, needs to be applied to the SMA element for it to revert to the deformed shape as it re-cools below the $M_f$ temperature. Although it will not be extensively discussed below in relation to the SMA actuators of this invention, it is to be assumed that a bias is or can be applied to the actuator to cause reversion to the deformed martensitic state as the SMA elements of the actuator cool below the $M_f$ temperature. This bias may be constantly present, e.g. applied by a spring (a constantly present bias applying increasing force with increasing contraction of the actuator), where the actuator has to overcome the force of the spring to cause motion of the actuator as it heats; or may be intermittently present, e.g. applied by an opposing actuator (where typically one actuator is heated and the other is unheated, but each may be heated to differing extents for precise control). The constant bias is economical, but has the disadvantage that a part of the actuator force is absorbed by the bias spring, leaving less available for the actuator to apply to an external load, also a spring bias provides the greatest limitation on actuator stroke; the opposed actuator bias offers greater force availability, since the opposed actuator when unheated takes little force to move, and greater position sensitivity when both are differentially energized, but at a cost in complexity of control and increased power consumption. Alternative constantly present biases are those where the force is constant with actuator contraction, such as where an actuator is mounted vertically, and a mass suspended from the actuator provides the bias, which allows a somewhat greater actuator stroke than when a spring bias is used; and those where the force decreases with contraction. This last type of bias is of particular interest, as it allows the greatest extent of contraction of the actuator and also provides the greatest the speed of contraction and extension of the actuator as the actuator is energized and de-energized. A suitable technique for providing a decreasing force bias is for the actuator to operate a lever (such as a cam) in which the lever arm relative to the actuator increases with increasing actuator contraction and/or the lever arm relative to the bias decreases with increasing actuator concentration. These various bias techniques are well known in the art.

SMA "wire" as used in this application refers to SMA material of elongate form, capable of contraction/elongation along the long axis. Thus the term "wire" does not imply a circular cross-section, although that will be the typical cross-section, but includes cross-sections that may be elliptical, square, rectangular, or the like. The "diameter" of an SMA wire of non-circular cross-section refers to the square root of (the cross-sectional area of the wire multiplied by $4/\pi$).

The "stroke" of an SMA wire segment is the change in distance between the fully extended length and the fully contracted length of the segment. The "stroke" of an SMA actuator is the change in distance between the fully extended length and the fully contracted length of the actuator. If the wire or actuator contains a limit stop(s) to limit either contraction and/or extension of the wire/actuator, then the "stroke" will be the distance between the limit stop(s), which may be less than the "stroke" if no limit stop(s) were present.

A "stroke multiplying" SMA actuator is an SMA actuator in which the stroke of the actuator is greater than the contraction or extension of an SMA wire of the external length of the actuator in the direction of its extension or contraction.

A "stacked plate" SMA actuator is one in which a series of rigid planar elongate members ("plates") are placed one above another with one end (the first end) of each member being connected by SMA wire to the non-corresponding end (the second end) of the member above it. Such actuators are illustrated extensively in this application. In a typical stacked plate actuator of this invention, the plates are metallic, and therefore thermally and electrically conductive, and they are therefore separated from one another in the stack by insulating layers.

By "close proximity" is meant that the distance between the SMA wires and the heat sink should be such that the conductive and radiative cooling of the SMA wires significantly exceeds (i.e., by at least 25%, preferably at least 50%) the cooling the wires would experience in free air initially at the same temperature as the heat sink, but without the heat sink present. Measured in terms of wire diameters, a suitable spacing is not more than 10 wire diameters, preferably not more than 8 wire diameters, more preferably not more than 5 wire diameters, and especially not more than 4 wire diameters. A certain minimum spacing is generally required to prevent inadvertent contact of the SMA wires with the heat sink, especially if the heat sink is electrically conductive, such as about 50–100 $\mu$m (relatively independent of wire diameter), and particularly suitable spacings are between 1 and 4 wire diameters, e.g. about 3 wire diameters. For a 75 $\mu$m diameter SMA wire, a suitable spacing is not more than 750 $\mu$m, preferably not more than 600 $\mu$m, more preferably not more than 400 $\mu$m, and especially not more than 300 $\mu$m. A particularly suitable spacing is between 100 and 300 $\mu$m, e.g. 200 $\mu$m.

A "heat sink" has the meaning usually given, i.e. a mass of a thermally conductive material positioned touching or at least in close proximity to an object to be cooled. Suitable materials are typically metals, especially highly conductive ones such as aluminum and its alloys, copper and its alloys (e.g. brasses, bronzes, copper/zinc/nickel alloys such as "nickel silver" or "German silver"), and the like. When the heat sink is electrically conductive, it may be desirable that it should be electrically insulated from the SMA wires to prevent inadvertent contact, and this may be done, e.g. with a layer of insulating lacquer or the like; though (1) this may not be necessary, and (2) if the heat sink is insulated, the insulation layer should be as thin as possible to maximize the heat transfer from the SMA wires to the heat sink.

The heat sink may, as stated before, be an element apart from the rigid members and SMA wires of the actuator, i.e. external to the actuator, in which case it may also be an active cooling element capable of energization during that part of the actuator cycle in which cooling of the SMA wires is desirable. A suitable such active cooling element is a Peltier junction element, in which cooling is generated by the passage of electricity through the junction of two dissimilar metals. Peltier junction elements are well-known in the art. It may be further possible, if the active cooling element is a Peltier junction element, to operate the junction in the reverse direction to add heat to the heat sink and thence to the SMA wires. The electrical circuitry and switching needed to use an active cooling or heating/cooling element such as a Peltier junction element in conjunction with an SMA actuator (e.g. to actuate the element to heat the heat sink as the actuator is energized and/or to cool the actuator when the actuator is de-energized) will be readily understandable to a person of ordinary skill in the art.

However, it is possible to use the thermal mass of the rigid members of the SMA actuator as the heat sink by placing the wires in close proximity to the members; and this technique offers the advantages of simplicity of design and cost reduction through the lack of need for an external heat sink, and the fact that the heat sink moves and re-shapes itself [through movement of the rigid members] as the wires contract and expand, so that it is always optimized for the wires; and it is this feature that will be particularly discussed further in this application.

By "at least a central portion of the wire" being in close proximity to the heat sink is meant that at least the central 20%, preferably at least the central 40%, especially at least the central 60%, more especially at least the central 70%, of the length of the SMA wire between its points of attachment to the rigid members is in close proximity to the heat sink. If the second feature of the invention, namely where the heat sink is sized and placed such that the end portions of the wires where they are attached to the rigid members are not in close proximity to the heat sink, is present, then preferably at least the end 1 mm, especially the end 1–3 mm, of the wire are not in close proximity to the heat sink; with the remainder being in close proximity to the heat sink. For lengthy actuators, the contraction loss from the fact that the end 1–2 mm portions of the wires adjacent to the point of attachment to the rigid members [assuming metallic rigid members] are cooled by conduction from the rigid members down the wire may not be significant; but when the actuators are to be miniaturized so that the operating length of each SMA wire is of the order of less than 1 cm to 5 cm, especially less than 1 cm to 3 cm, then the effect of better temperature control can significantly increase the effective operating length of the SMA wires. For example, if an actuator of 4.5 cm total length, having actuator wires of an operating length of 4 cm, suffers a loss of the end 2 mm of each wire adjacent their points of attachment in that these portions never become heated to $A_f$, then the loss of effective operating length of the wires is 10%. With the second feature of the invention, cutting the end loss from 2 mm to 1 mm, the operating length gains back 5%. If the actuator were 2.5 cm long, with actuator wires of an operating length of 2 cm, the loss without the second feature would be 20%, and the gain back of employing the second feature of the invention would be 10%. Considering that the wires are operated typically over a contraction range of only 3–4% of their operating length, it can readily be seen that as the actuators become shorter, temperature control improvements such as those of the second feature of this invention become of increasing value. Also, because the way to maximize contraction of the SMA wire is to heat as much of it as possible above $A_f$, as actuators are shortened, the desire to increase the power input to the SMA wire to heat the ends may result in excessive heating of the center length of the wire, thereby damaging it, if not immediately then at least over many cycles. The combination of the first and second features of the invention thus maximizes the effective operating length of the SMA wire, while minimizing the risk of overheating the wire, and thus optimizes the use of the SMA wire in the actuator.

As is well-known in the SMA actuator art, per unit length, the mass of wire to be cooled is proportional to the cross-sectional area of the wire (a function of the square of the wire diameter), while the cooling rate is proportional to the surface area of the wire (a function of the diameter). In fact, this ratio is further complicated by the thermal conductivity of the wire itself, but it can be seen that the rate of cooling of an SMA wire from its $A_f$ temperature to its $M_f$ temperature decreases substantially with decrease in wire diameter. This decreases the cycle time of an SMA actuator, since the heat-up time from the $M_f$ temperature to the $A_f$ temperature will always be substantially shorter than the cool-down time provided that sufficient power is applied to achieve a rapid heating rate. For example, while a 250 $\mu$m diameter wire actuator has a cycle time of 6–7 sec or more, a 50 $\mu$m diameter wire actuator has a cycle time of less than about 1 sec, and a 37 $\mu$m diameter wire actuator has a cycle time of about 0.4 sec for the first cycle.

The basic design of the stroke multiplying SMA actuator comprises a plurality of parallel, including concentrically arranged, rigid (i.e. non-SMA) members that are free to slide relative to one another, each connected one to another by SMA wires in such a way that the stroke of the actuator is substantially equal to the sum of the strokes of the individual SMA wires. In a "stacked plate" actuator, the actuator consists of a set of stacked parallel plates electrically insulated from one another and joined by SMA wires. The construction of such an actuator is shown in FIG. 2.

Figure 2:
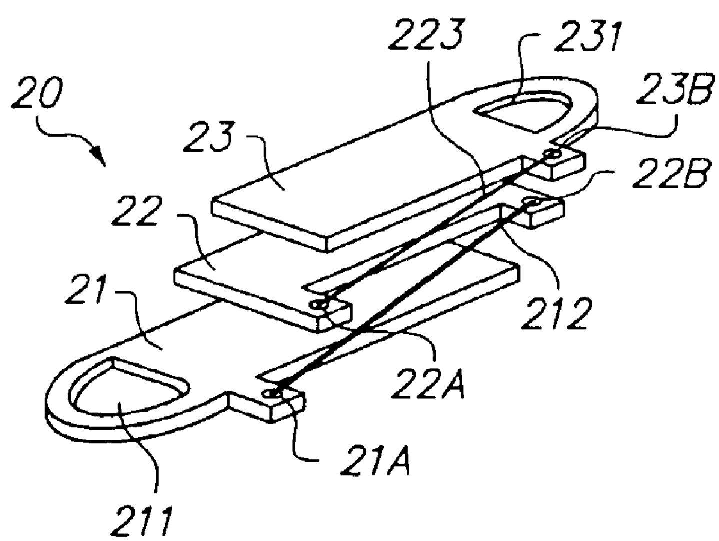
FIG. 2 shows, in perspective, a stacked plate SMA actuator, illustrating the placement of the SMA wires and rigid members.

FIG. 2 shows conceptually a stacked plate actuator shown generally at 20, comprising three rigid conductive plates 21 through 23 connected by two SMA wires 212 and 223. Wire 212 is connected to plate 21 at attachment point 21A and to plate 22 at attachment point 22B, while wire 223 is connected to plate 22 at attachment point 22A and to plate 23 at attachment point 23B. Plates 21 through 23 are spaced apart and electrically insulated from one another such as by sheets of polymeric material, such as thermoplastics (e.g. polyesters such as poly(ethylene terephthalate), polyamides such as nylons, polyimides such as KAPTON®, and the like), preferably a low-friction polymeric material (e.g. fluorinated polymers such as poly(tetrafluoroethylene)) placed between them or by a coating of polymeric material applied to the plates, so that the plates may readily slide with respect to each other. Plate 21 is provided with an external attachment point shown as aperture 211 at the end adjacent to wire attachment point 21A, while plate 23 is provided with an external attachment point shown as aperture 231 at the end adjacent to wire attachment point 23B. When a voltage is applied to the actuator between points on plates 21 and 23, the SMA wires 212 and 223 are heated and contract, thereby moving external attachment points 211 and 231 closer together. The stroke of the actuator will be approximately the sum of the contraction of wires 212 and 223, and therefore about twice the contraction of each wire individually, yet the force exerted will be not substantially lower than the force exerted by each wire. It will be evident that an increased stroke for the actuator can be obtained simply by increasing the number of plates and wires. In this Figure, which is intended to illustrate the principles of such an actuator, no particular spacing relationship (or "close proximity") between the SMA wires and the rigid plates is implied.

A variation on the actuator shown in FIG. 2 is shown in FIGS. 3, 4, 5A, and 5B, and here the first feature of the invention is illustrated.

Figure 3:
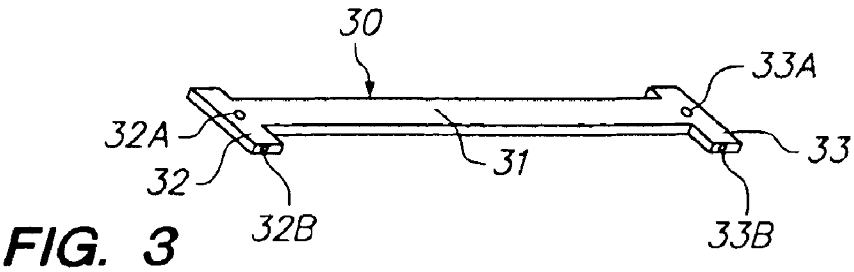
FIG. 3 shows a rigid element for a stacked plate SMA actuator showing one embodiment of the first aspect of this invention.

FIG. 3 shows an "I-beam" or "dogbone" shaped plate for this actuator. The plate shown generally at 30 has an elongate shaft 31 and ends 32 and 33. External attachment points 32A and 33A, which may, for example, be apertures into which external tendons or the like may be connected, may be present at either or both ends of the plate. Though only one end of the uppermost plate and the other end of the lowermost plate will typically be externally connected to convey the force of the actuator to an external load, it may be convenient for all plates to be made alike. Also present at ends 32 and 33 are wire attachment points 32B and 33B. These are shown at the sides of the ends for convenience, but may be attached wherever convenient. It is also possible that similar wire attachment points may be present on the other sides of the ends, thereby allowing two wires to be linked between each pair of plates and doubling the force available from the actuator. As will be seen from FIGS. 4, 5A, and 5B, no particular spacing relationship (or "close proximity") between the SMA wires and the rigid plates is implied, and because of the case holding the plates to form the actuator illustrated in these later Figures, a comparatively large spacing is expected.

Figure 4:
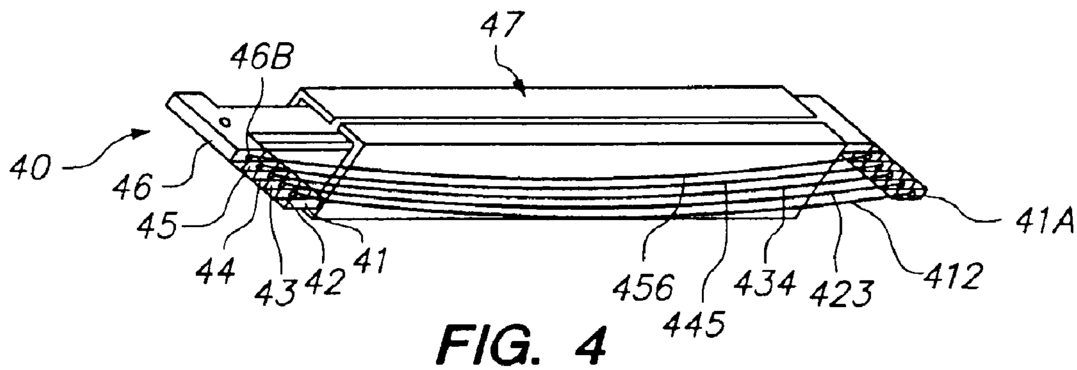
FIG. 4 is a perspective view of the embodiment of the SMA actuator using the rigid element of FIG. 3.

FIG. 4 is a perspective view showing an actuator, shown generally at 40, with six stacked plates 41 through 46 and five SMA wires 411 through 456. In this Figure, the wires are shown slack and the actuator is shown in its extended position. The plates 41 through 46, which are made of a conductive material such as brass, are held, spaced apart by insulating layers (not shown), in a case 47, which constrains the plates to move in parallel. The case 47, which is to act as the heat sink for the SMA wires, will be made of a suitable material for that purpose, such as a metal or metal alloy mentioned earlier, and will be electrically insulated from the plates, such as by an insulating lacquer or other insulating layer on the inside surface thereof. Power may be applied to the actuator between points 41A (where wire 412 is attached to plate 41) and 46B (where wire 456 is attached to plate 46), or, since the plates are electrically conductive, at any places on plates 41 and 46, and a circuit will be completed through all six plates and five wires.

Figure 5A:
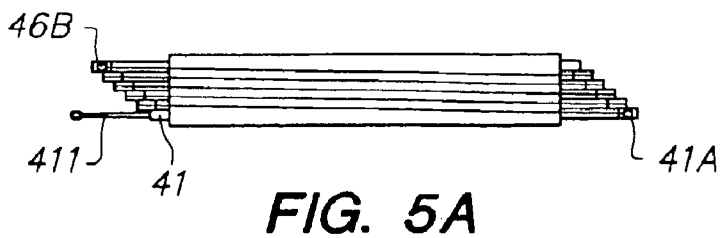
FIG. 5A shows the actuator of FIG. 4 in a side view in its extended configuration.
Figure 5B:
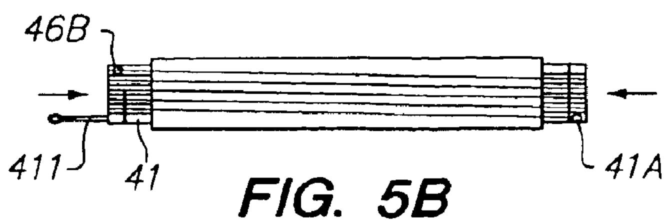
FIG. 5B shows the actuator of FIG. 5A in its contracted configuration.

FIGS. 5A and 5B are side views of such an actuator, in which FIG. 5A (like FIG. 4) shows the actuator in an extended position, and FIG. 5B shows it in a contracted position, with the heavy arrows showing the direction of contraction. Here the contraction has been shown as being symmetrical, so that the ends of the plates align, but this is not a requirement. The stroke of this actuator will be approximately five times the contraction of any wire individually, while the force that can be exerted by the actuator will not be substantially lower than the force exerted by any wire.

Although the actuator (like all SMA actuators of this invention) operates by contraction of the SMA wire as it is heated, so that the actuator decreases in length as shown in FIG. 5B, a person of ordinary skill in the art will readily understand that is possible to extend one of the plates, such as plate 41, with an extension 411 at the opposite end of the plate from the end having attachment point 41A. By comparing the relative positions of attachment point 46B and extension 411 in FIGS. 5A and 5B, it can be seen that extension 411 extends well beyond attachment point 46B when the actuator is contracted. Thus, by appropriate extension of one of the outermost plates and fastening of the other outermost plate, an actuator based on contraction may push a load instead of pulling it, as may be desired for the intended use.

In this variation of FIGS. 3 through 5B, as mentioned above, the SMA wires have been shown on one side only of the ends, but it is possible to have a second set of wires on the other side of the ends to double the actuating force. Also, as mentioned before, the number of plates and wires may be increased as desired to increase the stroke of the actuator.

A feature that is available to minimize the total voltage required to drive a multi-plate actuator as the number of plates increases is to use an odd number of plates (even number of SMA wires) and, instead of applying a voltage to the actuator between the outermost plates (where the resistance of the actuator, assuming the plate resistance to be significantly lower than the wire resistance, will be the sum of the resistances of all the wires), electrically linking the outermost plates and applying a voltage between these two outermost plates and the middle plate (where the resistance of the actuator will then be one-quarter the sum of the resistances of all the wires). This enables use of a lower supply voltage for a given current flowing through the actuator. If the outermost plates are not electrically linked, and a voltage is applied between one outermost plate and the middle plate, only half the actuator may be energized.

Of course, it is also possible to devise power circuitry for an actuator such that each SMA wire may be individually energized, or any chosen fraction of the number of wires energized (for example, one-third of the wires instead of one-half as in the previous paragraph), and such variations are included within this invention.

The case 47 acts as a heat sink for the wires by being placed around the plates in such a way that the wires are in "close proximity" (as hereinbefore defined) to the case.

Figure 6:
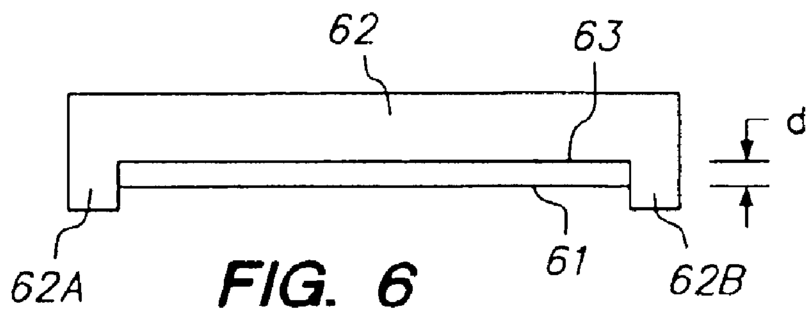
FIG. 6 shows a rigid element for an SMA actuator of this invention, showing the another embodiment of the first aspect of the invention.

FIG. 6 is a top view of a rigid member ("plate") for an SMA actuator of this invention, illustrating the spacing relationship between the SMA wire and the rigid member where the rigid member acts as a heat sink. For simplicity of understanding, none of the features of the rigid member other than those relating to the wire spacing (e.g. features relating to power supply to the actuator, motion of one plate against another, etc., some of which are shown in FIGS. 3 through 5B), are shown in FIGS. 6 through 8B. Also for simplicity of understanding, the SMA wire 61 is shown attached at both ends to the same rigid member, at ends 62A and 62B, and this is similarly shown in FIGS. 7 through 8B; though of course in an actual actuator, each wire will be attached between two adjacent rigid members to cause them to move one relative to the other (as shown in FIGS. 4 through 5B above and FIG. 9 below). The distance "d" between the SMA wire 61 and the rigid member 62 is such that the SMA wire is in "close proximity" (as defined) to the straight edge 63 of the rigid member nearest the wire; in an actual actuator, the SMA wire will be in "close proximity" to the nearest edges of the rigid members between which it is connected. In this manner, the temperature of the wire is controlled by the heat sink effect of the rigid member; and overtemperature excursions in the central section of the wire are avoided and the cooling rate of the wire when power is not applied is increased, achieving the benefits of the first feature of this invention. This offers advantages in cycle time, and is expected to offer an advantage in working life due to minimization of overheating (depending on the method of control employed for heating of the wire—if heating is controlled on shape of the contraction curve only, the advantage will not be great, but it will be greater if control is based on a wire temperature sensing method).

Because the SMA wire 61 is attached to rigid member 62 at ends 62A and 62B in an electrically conductive fashion (such as by crimping), there will not only be thermal loss from the SMA wire by conduction through the air to the rigid member 62 at its straight edge 63, there will also be thermal loss by conduction directly from the ends of the wire to the ends 62A and 62B of the rigid member 62 and conduction through the air to those ends 62A and 62B also. Therefore, when power is applied to the wire, there will be a temperature gradient along the wire, with the ends of the wire being cooler than the center section. The loss of "operating length" (the length of the wire that is capable of full contraction on energization of the actuator without damage to the wire) of the SMA wire due to inability to heat the end portions of the wire to $A_f$ without causing overheating of the central portion of the wire will be approximately 2 mm at each end, depending of course on the thermal mass of the rigid member 62 and especially its ends 62A and 62B where the wire 61 is connected.

Figure 7:
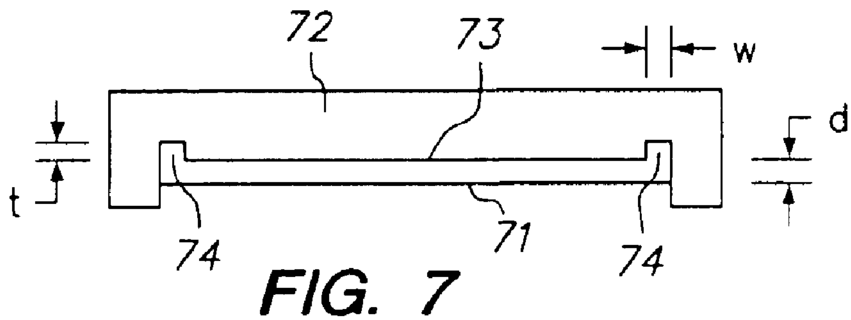
FIG. 7 shows another rigid element for an SMA actuator of this invention, showing an embodiment of the first and second aspects of this invention.

FIG. 7 is a top view of a rigid member ("plate") for an SMA actuator of this invention, illustrating the spacing relationship between the SMA wire and the rigid member where the rigid member acts as a heat sink and the second feature of the invention is present. The distance "d" between the SMA wire 71 and the rigid member 72 is such that the wire is in "close proximity" (as defined) to the straight edge 73 of the rigid member nearest the wire over the central portion of the wire, for example, so that a 75 $\mu$m wire is between 150 and 300 $\mu$m from the near edge of the rigid member. In this manner, the temperature of the wire is controlled by the heat sink effect of the rigid member; and overtemperature excursions in the central section of the wire are avoided and the cooling rate of the wire is increased, achieving the benefits of the first feature of this invention. Because of the recesses 74 cut into the rigid member at each end of edge 73, the heat transfer from the wire to the plate through the air will be decreased at these ends, and this will reduce the end loss of operating length described for FIG. 6. The depth "t" of each recess 74 will be such that the wire is not in "close proximity" to the rigid member at the bottom edge 75 of the recess, for example so that the wire is at least 10 wire diameters, especially at least 15 wire diameters (e.g. at least 750 $\mu$m, especially at least 1000 $\mu$m, for a 75 Jim wire) from the bottom edge of each recess to reduce the cooling effect of the rigid member acting as heat sink, and the width "w" of each recess will be such that the end cooling effect mentioned above is reduced to the extent practicable. A suitable width "w" will be at least 1 mm, and up to about 3 mm, though 1–2 mm will be typical for a rectangular recess 74.

Figure 8A:
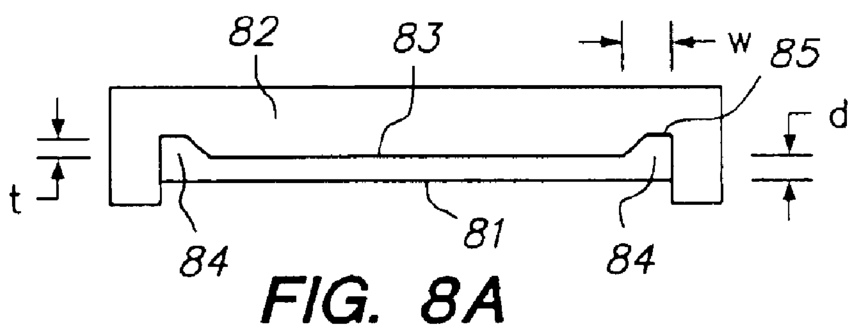
FIG. 8A shows another rigid element for an SMA actuator of this invention, showing another embodiment of the first and second aspects of this invention.

FIG. 8A is a top view of another rigid member ("plate") for an SMA actuator of this invention, illustrating the spacing relationship between the SMA wire and the rigid member where the rigid member acts as a heat sink and the second feature of the invention is present. The distance "d" between the SMA wire 81 and the rigid member 82 is such that the wire is in "close proximity" (as defined) to the straight edge 83 of the rigid member nearest the wire over the central portion of the wire. In this manner, the temperature of the wire is controlled by the heat sink effect of the rigid member; and overtemperature excursions in the central section of the wire are avoided and the cooling rate of the wire is increased, achieving the benefits of the first feature of this invention. Because of the recesses 84 cut into the rigid member at each end of straight edge 83, the heat transfer from the wire to the plate will be decreased at these ends, and this will reduce the end loss of operating length described for FIG. 6. The depth "t" of each recess 84 will be such that the wire is not in "close proximity" to the rigid member at at least the bottom edge 85 of the recess, for example so that the wire is at least 750 $\mu$m, especially at least 1000 $\mu$m from the bottom edge of each recess to reduce the cooling effect of the rigid member acting as heat sink, and the width "w" of the top of each recess will be such that the end cooling effect mentioned above is reduced to the extent practicable. A suitable width "w" will be at least 2 mm, and up to about 4 mm, though 3 mm will be typical for the top of each trapezoidal recess 84, while the width at the bottom of each recess will typically be at the lower end of that for the rectangular recess 74 of FIG. 7, e.g. 1–2 mm, especially 1–1.5 mm. The depth of the recesses in the rigid member will scale up or down for SMA wires of greater or lesser diameter, and rigid members of greater or lesser thickness or thermal conductivity, as the cooling of the wire through the air to the rigid member changes with these changes in the wire and rigid member; but the width will scale relatively less, because it is partially determined by the direct thermal conduction between the SMA wires and the rigid members at their attachment points.

Figure 8B:
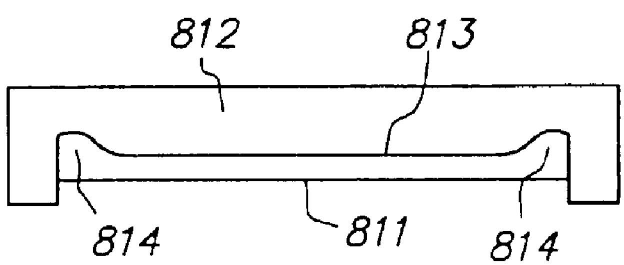
FIG. 8B shows another rigid element for an SMA actuator of this invention, showing another embodiment of the first and second aspects of this invention.

FIG. 8B is a top view of another rigid member ("plate") for an SMA actuator of this invention, similar to that of FIG. 8A, where the SMA wire 811 is in "close proximity" (as defined) to the edge 813 of the rigid member 812 nearest the wire over the central portion of the wire, but showing rounded recesses 814 instead of the sharp-cornered recesses 84 of FIG. 8.

The distance "d", and the shape of the recess in depth "t", width "w" and configuration, may be designed in the following manner, knowing the dimensions of the wire and the rigid member and their thermal properties, and assuming certain operating parameters such as the ambient temperature and the desired operating temperature of the wire:

(1) calculate the cooling of the wire at the connections (crimps) between the wire and the rigid member;

(2) calculate the cooling of the wire through the air to the rigid member, both to the ends of the rigid member and to its edge nearest the wire, for a chosen starting rigid member shape (e.g. the shape of FIG. 7);

(3) from these, determine the temperature profile for the wire;

(4) iteratively modify the rigid member shape and determine the temperature profile for the wire, aiming to achieve the lowest temperature difference along the wire by alteration of the rigid member shape.

The design of a suitable shape for the rigid members of the SMA actuators of this invention will be readily accomplished by a person of ordinary skill in the art of SMA actuators and engineering, having regard to that skill and the information available to such a person, including the documents referred to in this application, and this disclosure.

When the heat sink is neither a case around the plates of the actuator nor is the plates of the actuator itself, but is completely external to the actuator, all that is required for the first aspect of this invention is that the heat sink shall be in "close proximity" to the SMA wires of the actuator, and no illustration is believed necessary in that such a design will be self-evident from the description. Considerable freedom will then be available in the design of the heat sink to increase its efficiency, if desired, such as by adding cooling fins or other heat-shedding features to the sides of the heat sink that are not facing the actuator wires; however, the use of a completely external heat sink adds complexity and size to the finished actuator. One advantage of the external heat sink is that it permits the use of a heat sink that has an active cooling effect, such as the use of a Peltier junction element, which can provide a sub-ambient temperature environment for the SMA wires during the cooling cycle. Control of the Peltier junction element may be coordinated with the control of the SMA actuator, so that power is applied to the Peltier junction element when it is removed from the SMA wires, minimizing cooldown time for the SMA wires. It may be further possible, if the cooling element is a Peltier junction element, to operate the junction in the reverse direction to add heat to the heat sink and thence to the SMA wires during the energization of the actuator to minimize heat loss from the wires and increase the cycle speed of the actuator.

EXAMPLE

A Miniature Stroke Multiplying Actuator

Figure 9:
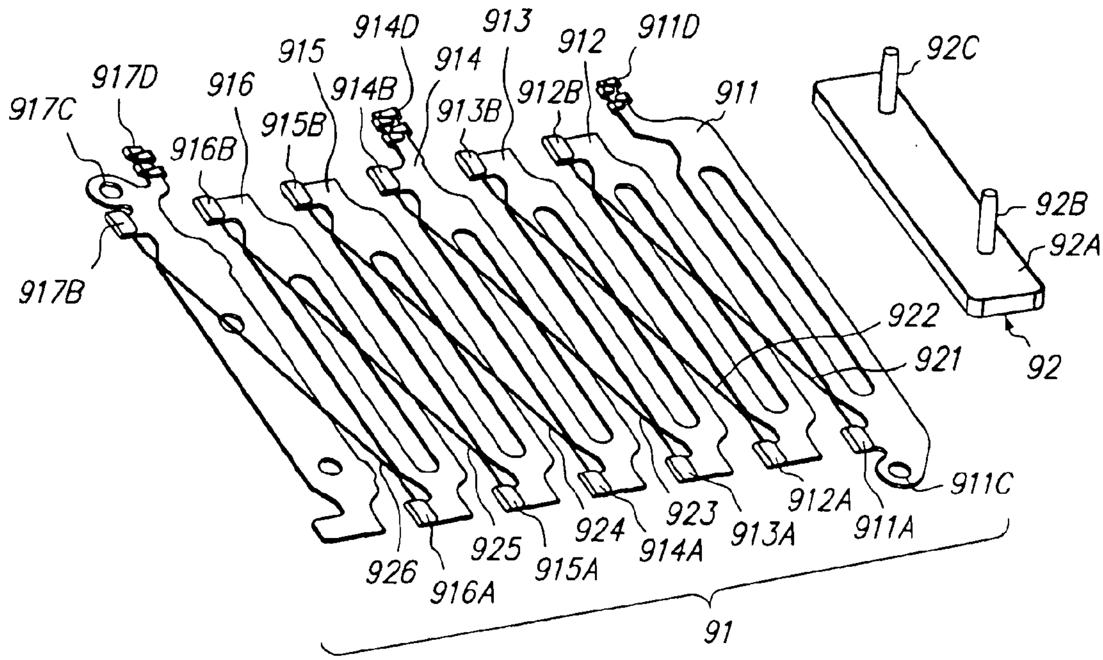
FIG. 9 shows the rigid members and SMA wires, and the base, of another SMA actuator of this invention, showing an embodiment of the first and second aspects of this invention.

FIG. 9 shows in exploded view the assembly, shown generally at 91, of the plates and wires of this embodiment, and the frame 92 onto which the plates are assembled. These plates will be stacked into a parallel array on the frame, with plate 911 being the lowest, followed in succession by plates 912 through 916, and topped by plate 917. Each plate is made of a material that is rigid yet soft enough to permit crimping of the material onto the SMA wires 921 through 926 at crimp joints 911A and 912B through 916A and 917B respectively without damaging the wires (excessive compression of the SMA wires causes fragility and change in transition properties). A suitable material for the plates is a half hard cartridge brass, or a half hard "nickel silver" alloy. Other methods of attachment of the wires may be used, but crimping is an attractive method for ease, economy, and not increasing the size of the assembled actuator. Lowermost plate 911, which is the plate of the actuator with the greatest travel relative to uppermost plate 917, is provided with an attachment point 911C for external connection to a load on which the actuator is to pull as it contracts and an attachment crimp 911D for attachment of a power lead (not shown). Middle plate 914 is also provided with attachment crimp 914D for attachment of a power lead (not shown). Uppermost plate 917 is provided with an attachment point 917C, for example to be used for the attachment of the actuator to an external structure, and is also provided with attachment crimp 917D for attachment of a power lead (not shown). The base 92 may be made of any suitable non-conductive or insulated material, such as a thermoplastic, e.g. an engineering thermoplastic, and comprises a base plate 92A from which protrude two spaced pins 92B and 92C. Each of the plates 911 through 916 is provided with a slot (not numbered), while uppermost plate 917 is provided with two holes (not numbered) and the plates are placed on the base plate 92A in order 911 through 917, with an insulating layer (which may be a separate piece of an insulating material such as a sheet of polymer, or may be an insulating layer coated on one or both sides of the plates) between each pair of plates, so that the pins 92B and 92C lie through the slots in the plates 911 through 916 and the holes in plate 917. The plates are shown as having recesses (not numbered) adjacent the crimp connections 911A through 917B, in the manner of the plates of FIGS. 7 or 8, and the wires 921 through 926 are spaced from the corresponding edges of the plates so that they are in "close proximity" to those edges, as described for FIGS. 6 through 8; so that both the first and second features of this invention are available for the actuator shown in FIGS. 9 and 10. The plates are held on the pins, so that they lie parallel to the base plate, by any conventional method; and a particularly convenient one is to thermally deform ("stake") the ends of the pins 92B, 92C protruding above plate 917 (as shown in FIG. 10) so that they retain the plates, in a manner well-known for the assembly of plastics components and as exemplified in the VELOBIND® binding system.

Figure 10:
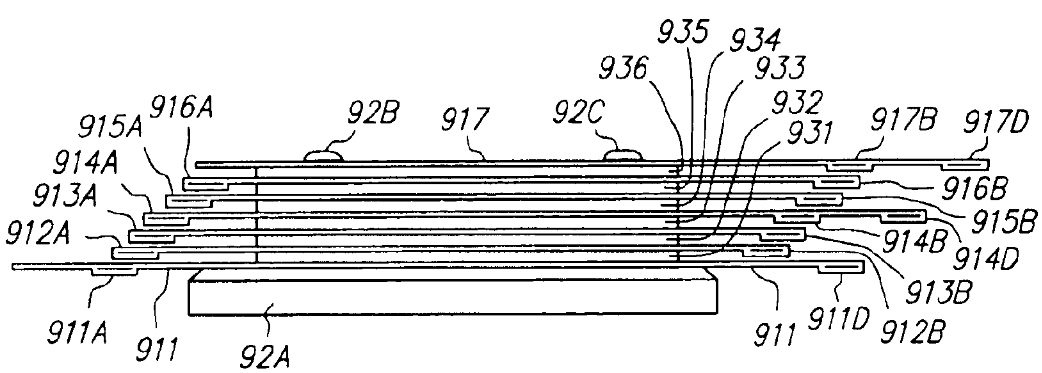
FIG. 10 is a side view showing the assembled actuator using the member/wire assembly of FIG. 9.

FIG. 10 shows the assembled actuator in side view. Although each of the plates 911 through 917 and the crimp joints 911A through 917B are shown, the SMA wires are not shown, for clarity. The plates 911 through 917 are made of half hard nickel silver [an alloy comprising 55.25% Cu, 27.17% Zn, 17.22% Ni, 0.26% Mn, and 0.02% Pb; ABC Metals, Inc., Elmhurst Ill., 770 Alloy], 200 μm thick, to allow adequate crimping of the SMA wires without damage and yet still give sufficient rigidity of the plates. Sheets of 250 μm PET [DuPont Teijin MYLAR® A] insulation 931 through 936 are placed between the plates, electrically insulating them one from another, and allowing plates 911 through 916 to slide with low friction as the actuator contracts and expands. The wires are 75 μm Dynalloy FLEXINOL™ TiNi alloy with a 90° C. transition temperature, and are attached under 10 g preload tension to avoid slack that would otherwise result in lost motion in the actuator. The distance between crimps (the length of each wire segment) is 27 mm; and the plates have a recess at each crimp of a shape similar to that of FIG. 8B, with a 1.0 mm depth, a width at the bottom of the recess of about 1.2 mm, and a width at the top of the recess of about 3.0 mm. The wires are crimped to the plates so that they lie about 200 μm from the near edge of the plate when the actuator is assembled. A suitable material for the frame is an engineering thermoplastic such as a filled nylon 6/6 (NYLATRON® GS), a polycarbonate, or the like. The resulting actuator has a height of 6.1 mm, a width of 5.3 mm, an extended length of 38.6 mm [from the attachment point at the end of the lowermost plate to the attachment crimp for the power lead at the opposite end of the uppermost plate], and a contracted length of 34.6 mm, giving a 4 mm stroke (12% stroke/length ratio). The completed actuator weighs only 1.1 g. The actuator has a contraction force of 70 g, a return force of 4 g, and a limit force exceeding 500 g. At 4.0 V, the peak current is 470 mA. The pins 92B and 92C interact with the slots in the plates to act as mechanical stops, limiting the maximum extension and contraction of the actuator and travel of the plates and, in particular, plate 91, to which a load may be attached. In this way: (1) the application of an excessive external extension force much greater than the force exertable by the actuator cannot over-stress the SMA elements; and (2) the actuator does not contract to the limit of its capability, thus ensuring that even as the SMA elements age and lose recoverability, as is well known for SMA elements, the actuator will still move over the full range between the limit stops.

In a further feature of this invention, the actuator may be provided with electrical sensors to detect maximum extension or contraction of the actuator, and, for example, the sensor that detects maximum contraction of the actuator may connect to a switch in the circuit that supplies power to the SMA wires, where the switch allows power to flow to the actuator when the actuator is operating within its normal range of contraction, but cuts power when the actuator reaches maximum contraction.

Figure 11:
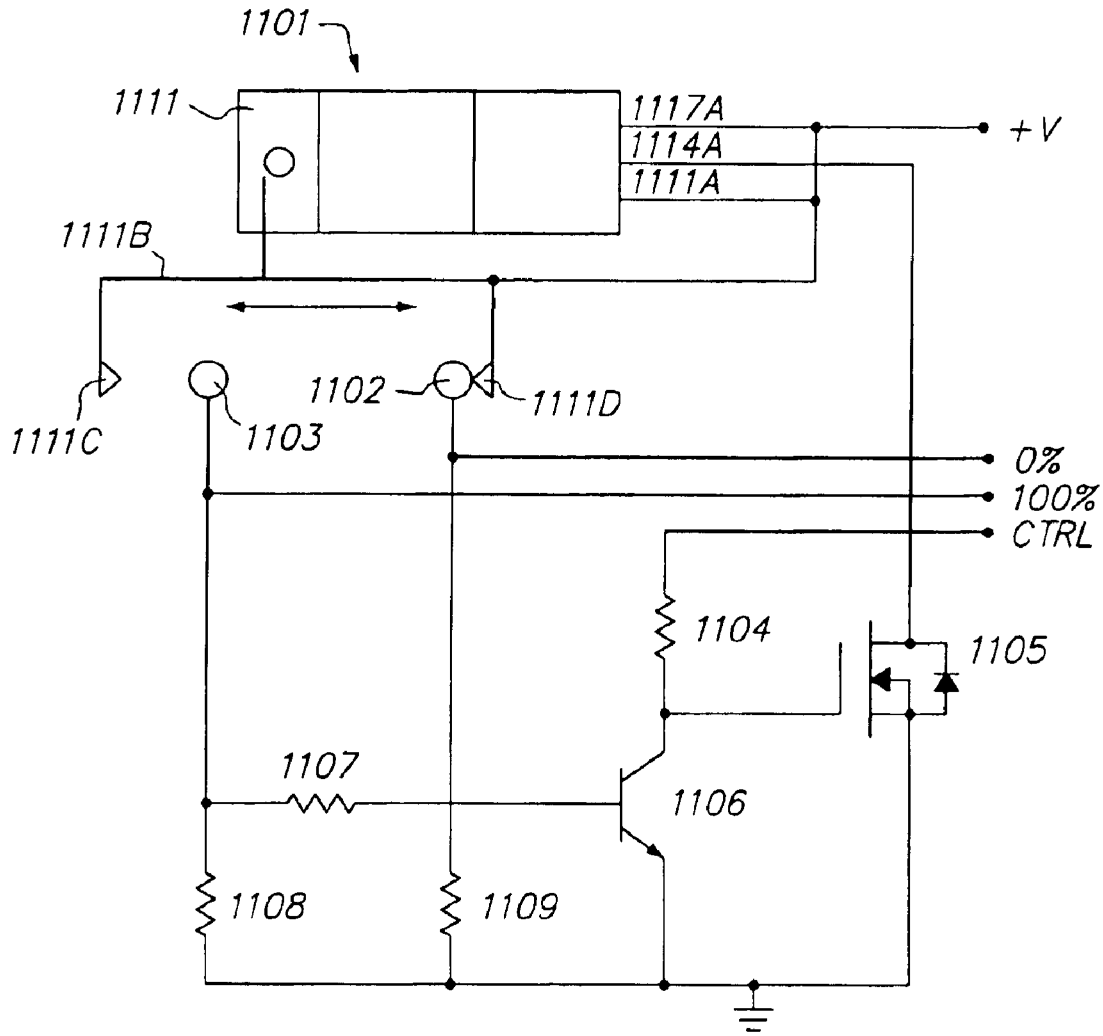
FIG. 11 shows schematically the aspect of this invention where the actuator has a switch to cut power to the actuator when the actuator reaches a desired contraction limit.

An exemplary circuit providing this function, particularly adapted to digital control of the actuator, is shown in FIG. 11.

In FIG. 11 an actuator is shown schematically at 1101. The actuator 1101 is a seven-plate actuator of the type shown in FIGS. 9 and 10, with lowermost plate 1111 being the plate having the greatest range of movement (i.e. the plate that would be connected to a load), and the remaining plates not shown. Power is applied to the actuator 1101 by connection of the lowermost plate 1111 and the uppermost plate to the power source, schematically +V, by wires 1111A to the lowermost plate 1111 and 1117A to the uppermost plate; while the middle (fourth) plate is connected by wire 1114A to ground through the drain of MOSFET 1105. Thus, in this circuit, two "halves" of the actuator are operated in parallel at a lower voltage, rather than a higher voltage being applied between the uppermost and lowermost plates, as has been discussed previously. Plate 1111, which is conductive, electrically comprises a circuit from contact 1111C through the plate (shown in the electrical circuit as 1111B) to contact 1111D. When the actuator 1101 is fully extended, i.e. at 0% contraction, contact 1111D touches pin 1102, and the 0% signal is at +V (digitally high), allowing sensing of the 0% position by an external control circuit (not shown); similarly, when the actuator 1101 is fully contracted, i.e. at 100% contraction, contact 1111C touches pin 1103, and the 100% signal is at +V (digitally high), allowing sensing of the 100% position by an external control circuit. When a CTRL signal is applied, it raises the voltage at the gate of MOSFET 1105 so that MOSFET 1105 is turned on and power is applied to the actuator 1101 between plates 1111/1117 and plate 1114, thereby energizing the actuator 1101 and causing the SMA wires, and hence the actuator 1101 itself, to contract. As it begins to contract, contact 1111D will separate from pin 1102, and the 0% signal will become digitally low. When the actuator 1101 is fully contracted, contact 1111C will touch pin 1103, and the 100% signal will become digitally high; also, transistor 1106 will be turned on, thereby dropping the voltage at the gate of MOSFET 1105 and causing it to turn off power to actuator 1101 . As the actuator cools and expands again, contact 1111C separates from pin 1103, MOSFET 1105 turns on again, and the actuator re-contracts. Thus, as long as the CTRL signal is applied, the actuator will contract to 100% contraction, and then cycle at very close to 100% contraction. Resistors 1104 and 1107 through 1109 control the current through the circuit. For the actuator shown in FIGS. 9 and 10 and described in the specification above, the cycle rate for this contraction and re-expansion near 100% contraction will be about 50 Hz, so that the actuator 1101 appears to remain fully contracted while the power consumed is self regulated. For such an actuator, a suitable MOSFET is the IRLML2502 and a suitable transistor is the MMBT3904, while suitable resistor values are 10 KΩ. These, together with the pins 1102 and 1103, may be surface mounted on a flexible circuit mounted below and within a hollow portion of the base of the actuator, thereby minimizing the size of the actuator and control circuitry.

The advantage of employing a circuit such as that shown in FIG. 11 is two-fold: first, the circuit cuts power to the actuator as soon as the actuator has contracted to its desired extent. This ensures that the actuator no longer consumes power, whether or not a control signal is applied, once it reaches the desired limit of contraction, minimizing power consumption that would otherwise occur as the actuator forced itself against a stop or attempted to contract further. It also ensures that the SMA wires of the actuator are not overheated by the continuing application of power even though the desired contraction has been achieved, and this reduction in stress and reduction in maximum temperature of the SMA wires reduces fatigue and maximizes the working lifetime (number of cycles) of the actuator. Second, the circuit enables the actuator to remain at the desired extent of contraction, possibly for an extended period, at minimum power consumption, and at minimum SMA wire temperature. For as long as the control signal is applied and the actuator is not fully contracted, power is applied to the actuator to cause it to contract. Once the actuator fully contracts, the power is cut. However, as soon as the SMA wires cool and re-extend, the actuator re-expands, and power flow to the actuator is re-established. The actuator then again contracts, again cutting the power to the actuator, and so on. The on-off cycling may be sufficiently rapid that the SMA wires reaches essentially a constant temperature just sufficient to hold the actuator at maximum contraction, which may, for example be a temperature below $A_f$, again minimizing fatigue and maximizing working life of the actuator. Further, since the SMA wires reach only that temperature necessary to reach maximum contraction, once the control signal is cut, they will cool more rapidly than if they had been heated to $A_f$, and this will decrease the cycle time (increase the cycle rate) for the actuator.

While the temperature control benefit of this aspect has been described only in detail in terms of a demonstration of the operation of an SMA actuator, it will be evident to a person of ordinary skill in the art that this embodiment can be applied to all SMA actuators in which the benefits achievable by this embodiment are necessary or desired, such as those where the desired contraction is to be limited to less than the maximum contraction of the actuator, where the actuator is desired to remain activated (contracted) for an extended period of time, or where faster cycling and/or longer life of the actuator are desired; and that other methods than that shown can be used to accomplish the sensing and switching. For example, this control technique can be performed by the use of sensors/switches remote from but operatively connected to the actuator (e.g. connected to the load to which the actuator is connected); and can be performed by purely electrical circuitry and a simple switch closed by maximum contraction of the actuator rather than by the transistor circuitry described with respect to FIG. 11. Thus this fourth aspect of the invention may readily be applied to SMA actuators of this invention having only the first aspect, the first and second aspects, or all other aspects of this invention.

The software needed to implement the various functions, including sensing and control functions, for the SMA actuators of this invention will be readily accomplished by a person of ordinary skill in the art of SMA actuators and associated electronics and their use, having regard to that skill and the information available to such a person, including the documents referred to in this application, and this disclosure.

While several aspects of this invention have been shown, each offering their own benefits when applied to SMA actuators, so that an SMA actuator featuring just one of the aspects will show a benefit over an actuator not employing that aspect, it will be evident that the benefits of the applied aspects may be additive if more than one aspect is applied to a given actuator, so that an SMA actuator employing more than one aspect of this invention may show a greater benefit than an actuator employing fewer of these aspects.

Various modifications and variations of the present invention will be apparent to a person of ordinary skill in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to persons of ordinary skill in the art are intended to be within the scope of this disclosure and the appended claims.

We claim:

1. A stroke-multiplying shape memory alloy (SMA) actuator comprising:

a heat sink having a first surface and a second surface, the second surface being a recess in the heat sink to increase the operating length of the SMA wire; and at least three rigid parallel elongate members, each having a long axis and being slideable relative to one another parallel to that long axis, each connected one to another by an SMA wire such that the stroke of the actuator is substantially equal to the sum of the stroke of the SMA wires, where at least the central portion of one SMA wire of the SMA wires is in close proxmity and external to the first surface of the heat sink, and an end portion of the one SMA wire is proximate to the second surface of the heat sink and external to the recess.

wherein the rigid parallel elongate members of the actuator constitute the heat sink, wherein a depth of the recess below the first surface is a function of at least a dimension of the one SMA wire and a surface area of the recess.

2. The actuator of claim 1 where the elongate members are parallel plates.

3. The actuator of claim 2 where the elongate members are stacked parallel conductive plates electrically insulated one from another.

4. The actuator of claim 3 where each two plates are separated by a layer of polymeric material.

5. The actuator of claim 4 where the plates comprise a top plate, a bottom plate, and at least one intermediate plate, each plate having first and second ends and the first ends of all plates being aligned generally one above another and the second ends of all plates being aligned generally one above another, a first SMA wire having a first end connecting adjacent the first end of the bottom plate and a second end connecting adjacent the second end of the intermediate plate immediately thereabove, a second SMA wire having a first end connecting adjacent the first end of an intermediate plate immediately below the top plate and a second end connecting adjacent the second end of the top plate, and if more than one intermediate plate present, an SMA wire having a first end connecting adjacent the first end of each intermediate plate and a second end adjacent the second end of the plate immediately thereabove.

6. The actuator of claim 1 where the distance between the central portion of each SMA wire and the heat sink is not more that 10 times a diameter of the wire.

7. The actuator of claim 6 where the distance between the central portion of each SMA wire and the heat sink is not more than 8 times the diameter of the wire.

8. The actuator of claim 7 where the distance between the central portion of each SMA wire and the heat sink is between 1 and 4 times the diameter of the wire.

9. The actuator of claim 1 where at least the central 20% of each SMA wire is in close proximity to the heat sink.

10. The actuator of claim 9 where at least the central 40% of each SMA wire is in close proximity to the heat sink.

11. The actuator of claim 10 where at least the central 70% of each SMA wire is in close proximity to the heat sink.

12. The actuator of claim 1 where at least the end 1 mm of each end portion of each SMA wire is not in close proximity to the recess.

13. The actuator of claim 11 where at least the end 1.5 mm of each end portion of each SMA wire is not in close proximity to the recess.

14. The actuator of claim 4 where the heat sink comprises the parallel conductive plates of the actuator.

15. The actuator of claim 14 where each plate has an edge parallel to the long axis, the edge being nearest an SMA wire attached to the plate at a position adjacent an end of the plate, the edge being such that at least the central 60% of each wire is in close proximity to the edge, where the plate includes the recess therein adjacent a point of attachment of the wire to the plate so that the wire is not in close proximity to the edge for at least the first 1 mm of the wire from the point of attachment to the plate.

16. The actuator of claim 1 where the heat sink is external to the actuator.

17. The actuator of claim 16 where the heat sink is an active cooling element.

18. The actuator of claim 1 having a desired contraction limit and a power supply circuit supplying power to the actuator to cause it to contract, the power supply circuit comprising a switch that is normally closed when the actuator is contracted to less than the desired contraction limit and is opened by the actuator reaching the desired contraction limit.

19. A stroke multiplying shape memory actuator of claim 1 wherein at least one of the rigid elongate members operates as a heat sink.

20. A shape memory alloy actuator comprising:

a rigid planar elongate member having a recess formed therein;

a shape memory alloy wire having a first end, a central portion and a second end;

wherein, the first end of the shape memory alloy wire is attached to the rigid planar elongate member proximate to and external to the recess; and a second rigid planar elongate member having a recess formed therein and the second rigid elongate member being slideable relative to the rigid elongate member;

wherein, the second end of the shape memory alloy wire is attached to the second rigid planar elongate member proximate to the recess formed in the second rigid planar elongate member, wherein the central portion of the shape memory alloy wire is in close proximity to one of the rigid planar elongate member and the second rigid planar elongate member.

21. The shape memory alloy actuator of claim 20 wherein the rigid planar elongate member operates as a heat sink for the shape memory alloy wire.

22. The shape memory alloy actuator of claim 20 wherein the rigid planar elongate member has a recess formed at each end.

23. A sliding plane shape memory alloy ("SMA") actuator comprising:

a rigid member having a recess formed therein, the rigid member being one of a number of rigid parallel elongate members, each having a long axis and being slideable relative to one another parallel to that long axis, each connected one to another by an SMA wire such that the stroke of the actuator is substantially equal to the sum of the stroke of the SMA wires; and a shape memory alloy wire attached to the rigid member, at least a portion of the shape memory alloy wire being external to the recess;

wherein, a first heat transfer mechanism dominates the heat transfer between the central portion of the shape memory alloy wire and the rigid member such that the proximity of the central portion of the shape memory alloy wire to the rigid member alters the effectiveness of the first heat transfer mechanism, and a second different heat transfer mechanism dominates the heat transfer between the portion of the rigid member having the recess formed therein and the portion of the shape memory alloy wire proximate to the portion of the rigid member having a recess formed therein, the second heat transfer mechanism being dominated by thermal conduction through a point of attachment between the shape memory alloy wire and the rigid member, wherein at least the first heat transfer mechanism depends on one or more of the following;

a dimension of the shape memory alloy wire, a dimension of the rigid member, a distance between the central portion and the rigid member, and a thermal property for the rigid member and the SMA wire.

24. The sliding plane shape memory alloy actuator of claim 23, wherein the shape memory alloy wire thermal gradient is modified by adjusting the relative contributions of the first heat transfer mechanism and the second different heat transfer mechanism.

25. A stroke-multiplying shape memory alloy (SMA) actuator comprising:

at least three rigid parallel elongate members, each having a long axis and being slideable relative to one another parallel to that long axis, each connected one to another by an SMA wire such that the stroke of the actuator is substantially equal to the sum of the stroke of the SMA wires, each including an edge parallel to the long axis, the edge having a central edge surface and at least one end edge surface, where the central edge surface is at a first distance to at least a central wire portion of the SMA and the least one end edge surface is at a second distance to an end portion the SMA wire, wherein the first distance is such that the central edge surface is in close proximity to the central wire portion of the SMA wire, the central edge surface operating as a heat sink to primarily effectuate heat transfer from the central wire portion, and the second distance locates the at least one end edge surface not at close proximity to the end portion of the SMA wire so to primarily effectuate conductive heat transfer into an attachment point of one member of the at least three rigid parallel members to which the end portion of the SMA wire is connected, wherein the second distance from a unit of surface area of the end edge surface to a nearest point on the end portion of the SMA wire is a function of at least a dimension of the SMA wire, and a surface area of the end edge surface, such that the end edge surface is configured to thereby increase the operating length of the SMA wire.

26. The actuator of claim 25 wherein the distance is also a function of a thermal property of the one member and the SMA wire, and an ambient temperature.

27. The actuator of claim 25 wherein the central wire portion is at least 60% of the length of the SMA and the end edge surface resides near at least the first 1 mm along the SMA wire from the attachment point at the one member.

28. The actuator of claim 25 wherein the end edge surface further comprises at least two units of surface area, where a first unit is at the second distance to a first point on the SMA wire and a second unit is at a third distance to a second point on the SMA wire, wherein the second distance is such that heat is only conductively transferred from the first point, and the third distance is such that from the second point an amount of heat is transferred conductively into the attachment point and another amount of heat is transferred into the second unit of surface area.

29. The actuator of claim 25 having a desired contraction limit and a power supply circuit supplying power to the actuator to cause it to contract, the power supply circuit comprising a switch that is normally closed when the actuator is contracted to less than the desired contraction limit and is opened by the actuator reaching the desired contraction limit.

30. The actuator of claim 25 wherein the dimension is a diameter.

31. A stroke-multiplying shape memory alloy (SMA) actuator comprising:

a top plate having a first end portion and a second end portion;

at least one intermediate plate having a first end portion and a second end portion;

a SMA wire having a first wire end portion connecting adjacent the first end portion of an intermediate plate immediately below the top plate and a second wire end portion connecting adjacent the end portion of the top plate;

a bottom plate having a first end portion and a second end portion, where the bottom plate, the at least one intermediate plate and the top plate are thermally conductive and are arranged in a stack, each plate having a long axis and is slideable along that long axis;

another SMA wire having a first wire end portion connecting adjacent the first end portion of the bottom plate and a second wire end portion connecting adjacent the second end portion of the intermediate plate immediately thereabove, wherein each plate includes an edge parallel to the long axis, the edge comprising an end edge portion associated with each of the first and the second end portions of the plate, the end edge portion having an end edge surface, a portion of which is at a distance that is not at close proximity nearest one of either the first wire end portion or the second wire end portion of one wire of either the SMA wire or the another SMA wire, the distance primarily effectuating conductive heat transfer with either the first or the second end portions of the plate, and a central edge portion having an central edge surface that is at close proximity nearest a central wire portion of at least one of the SMA wire and the another SMA wire attached to an adjacent plate, the central edge surface configured to operate as a heat sink to primarily effectuate heat transfer with the central edge portion, wherein the distance from a unit of surface area of the end edge surface to a nearest point on one of either the first wire end portion or the second wire end portion is a function of at least a dimension of the one wire, and a total surface area of the end edge surface, such that the end edge surface is configured to thereby increase the operating length of the one wire.

32. The actuator of claim 31 wherein the distance is also a function of a thermal property of the plate and the one wire, and an ambient temperature.

33. The actuator of claim 31 wherein the central wire portion is at least 60% of the length of each wire and the end edge surface resides near at least the first 1 mm along the one wire from the point of attachment at the plate.

34. The actuator of claim 31 wherein the end edge surface further comprises at least two units of surface, where a first unit is at a first distance to a first point on the one wire and a second unit is at a second distance to a second point on the one wire, wherein the first distance is such that at the first point heat is only conductively transferred and the second distance is such that at the second point heat an amount of heat is transferred conductively into either the first end portion or the second end portion of the plate and another amount of heat is transferred into at least the second unit of surface area.

35. The actuator of claim 31 having a desired contraction limit and a power supply circuit supplying power to the actuator to cause it to contract, the power supply circuit comprising a switch that is normally closed when the actuator is contracted to less than the desired contraction limit and is opened by the actuator reaching the desired contraction limit.

36. The actuator of claim 31 wherein the dimension is a diameter.

* * * * *